(12) United States Patent
Yu et al.

(10) Patent No.: US 6,939,101 B2
(45) Date of Patent: Sep. 6, 2005

(54) WINDMILL

(76) Inventors: Young-Sil Yu, 108-1503, Dogok Samsung Remian Apt. Dugok 2-dong, Kangnam-ku, Seoul (KR); Byung-Soo Yu, 108-1503, Dogok Samsung Remian Apt. Dogok 2-dong, Kangnam-ku, Seoul (KR)

( * ) Notice: Subject to any disclaimer, the term of this patent is extended or adjusted under 35 U.S.C. 154(b) by 91 days.

(21) Appl. No.: 10/690,622

(22) Filed: Oct. 23, 2003

(65) Prior Publication Data

US 2005/0019150 A1 Jan. 27, 2005

(30) Foreign Application Priority Data

Jul. 25, 2003 (KR) .................................. 10-2003-0051293

(51) Int. Cl.[7] .................................................. F03B 13/00
(52) U.S. Cl. .................. 415/4.2; 415/149.1; 415/211.2; 415/907
(58) Field of Search .......................... 415/4.2, 4.4, 127, 415/149.1, 149.2, 159, 160, 211.2, 907; 290/44, 55

(56) References Cited

U.S. PATENT DOCUMENTS 4,164,382 A * 8/1979 Mysels ........................ 415/4.4
4,415,814 A * 11/1983 Martinez ...................... 290/55
4,508,973 A * 4/1985 Payne .......................... 290/55
5,020,967 A * 6/1991 Gual et al. ................... 415/4.4
6,518,680 B2 * 2/2003 McDavid, Jr. ............... 290/55

* cited by examiner

Primary Examiner—Edward K. Look
Assistant Examiner—Igor Kershteyn
(74) Attorney, Agent, or Firm—Arent Fox

(57) ABSTRACT

A windmill. A wind intake section has wind guide plates, a wind inlet defined between two adjoining wind guide plates, and a wind inlet opening and closing device placed at the wind inlet. The wind inlet opening and closing device is opened by the wind flowing through the wind inlet into the windmill and closed by the wind flowing through the wind inlet out of the windmill. A power generating section is disposed to rotate rotors by the wind introduced into the windmill through the wind intake section and thereby generate electricity. A wind exhaust section has a wind outlet, and a wind outlet opening and closing device placed at the wind outlet. The wind outlet opening and closing device is opened by the wind flowing through the wind outlet out of the windmill and closed by the wind flowing through the wind outlet into the windmill.

3 Claims, 4 Drawing Sheets

WINDMILL

TECHNICAL FIELD

The present invention relates, in general, to a windmill and, more particularly, to a windmill which is constructed to generate electricity through the efficient use of wind irrespective of a wind direction or a wind velocity.

BACKGROUND ART

As well known to those skilled in the art, the wind is a phenomenon in which air flows due to its density differences in the atmosphere. The wind has been used since ancient times. These days, as the resources such as petroleum and coal are gradually becoming exhausted, interest toward wind as alternative energy source is increasing.

In this consideration, a windmill is disclosed in the art, which generates electricity using the wind. Referring to FIG. 5, there is shown a perspective view illustrating a conventional windmill. The windmill comprises a support column 4 which is fixedly installed on the ground to have a height of no less than 5 m, a propeller-shaped rotor 6 which is mounted to an upper end of the support column 4 and has at least two blades integrally formed with each other, and a generator 5 which generates electricity using rotation force of the propeller-shaped rotor 6.

In the windmill constructed as mentioned above, as the propeller-shaped rotor 6 is rotated by the wind, the generator 5 generates electricity. Electricity generated by a plurality of windmills operated in this way is collectively charged in a charger to then be appropriately supplied to places under need.

However, the conventional windmill is encountered with a problem in that, only when the wind flows at a velocity greater than a predetermined value and the air has a high density, the propeller-shaped rotor 6 can be rotated to convert the wind into electric power. Therefore, in the case that a gentle wind blows, it is impossible to generate electricity using the conventional windmill. Further, operational efficiency of the windmill is deteriorated in urban areas and mountain villages where the wind direction frequently changes. Moreover, since the conventional windmill is likely to be broken by strong wind, repair and maintenance expenses are increased, whereby economic efficiency is degraded.

DISCLOSURE OF THE INVENTION

Accordingly, the present invention has been made keeping in mind the above problems occurring in the prior art, and an object of the present invention is to provide a windmill which has wind guide plates extending in a radial direction and an upper plate for preventing dispersion of the wind, so that electricity can be generated irrespective of a wind direction or a wind velocity even when a gentle wind blows, and is constructed not to be easily broken even by strong wind so that repair and maintenance expenses can be reduced and economic efficiency is ensured.

In order to achieve the above object, according to the present invention, there is provided a windmill, comprising: wind intake means having wind guide plates which are radially located to guide wind in a predetermined direction, an upper plate which is installed on upper ends of the wind guide plates to prevent dispersion of the wind, a wind inlet which is defined between inner ends of two adjoining wind guide plates, and a wind inlet opening and closing device which is placed at the wind inlet so that the wind inlet opening and closing device is opened by the wind flowing through the wind inlet into the windmill and closed by the wind flowing through the wind inlet out of the windmill; power generating means disposed in a power generating tunnel which is defined at a lower end of the wind intake means, to rotate rotors by the wind introduced into the windmill through the wind intake means and thereby generate electricity; and wind exhaust means having a wind outlet which is defined below the wind inlet so that the wind used for generating electricity can be discharged to the outside through the wind outlet, and a wind outlet opening and closing device which is placed at the wind outlet so that the wind outlet opening and closing device is opened by the wind flowing through the wind outlet out of the windmill and closed by the wind flowing through the wind outlet into the windmill.

BRIEF DESCRIPTION OF THE DRAWINGS

The above and other objects, features and other advantages of the present invention will be more clearly understood from the following detailed description when taken in conjunction with the accompanying drawings, in which.

BEST MODE FOR CARRYING OUT THE INVENTION

Figure 1:
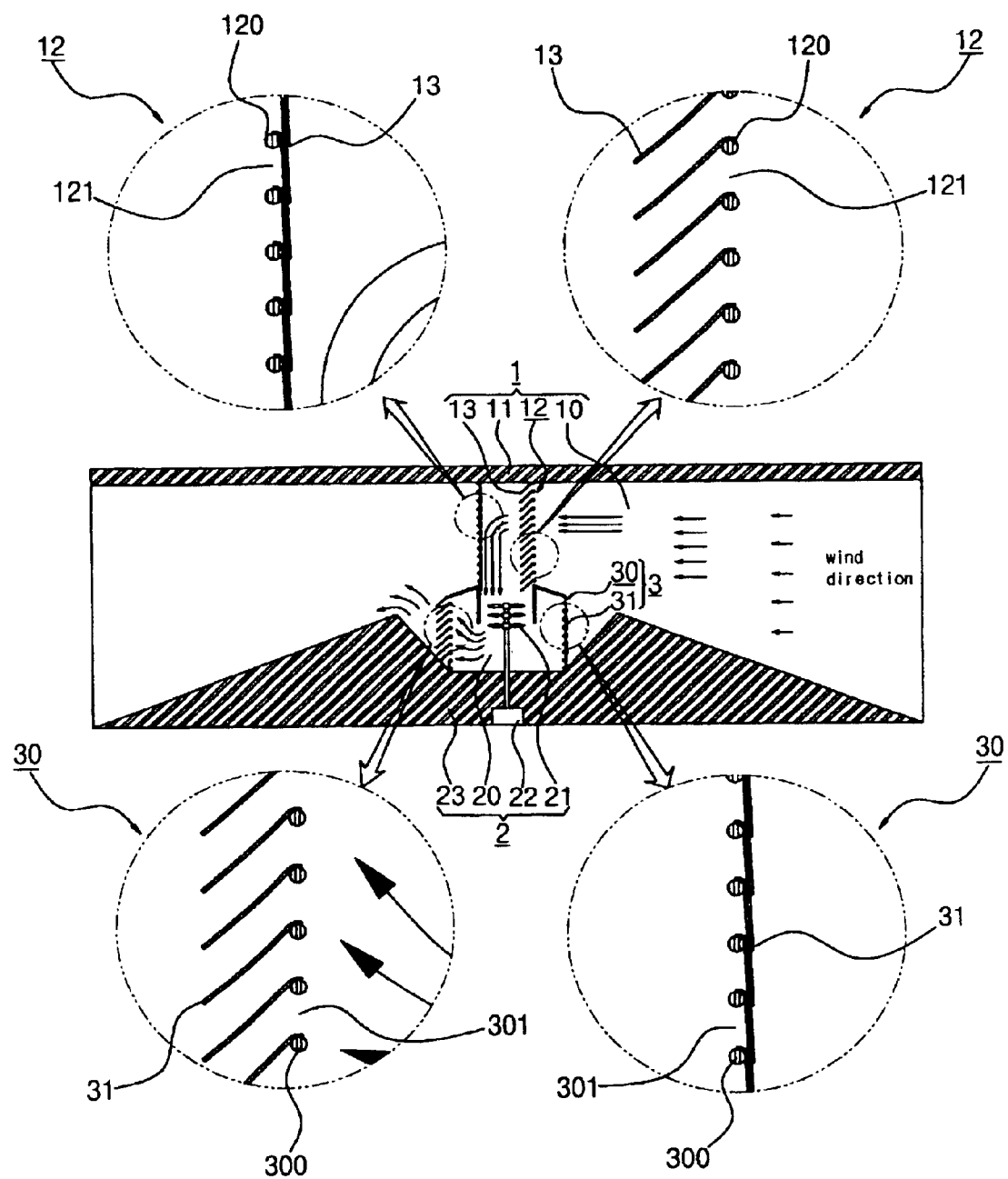
FIG. 1 is a partially enlarged cross-sectional view illustrating the entire construction of a windmill in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
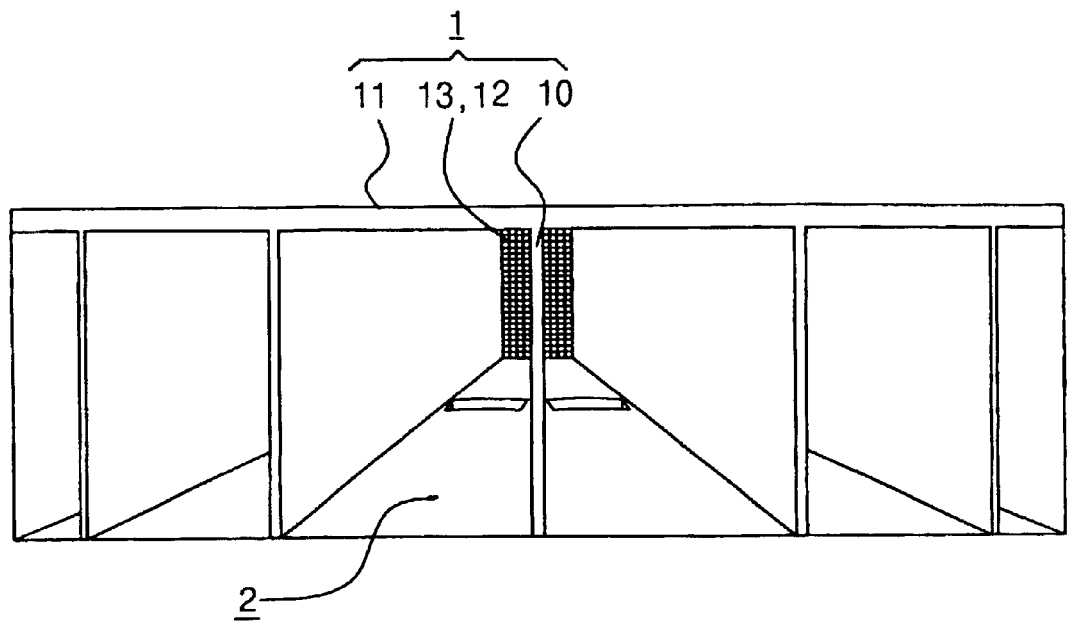
FIG. 2 is a front view of the windmill according to the present invention.
Figure 3:
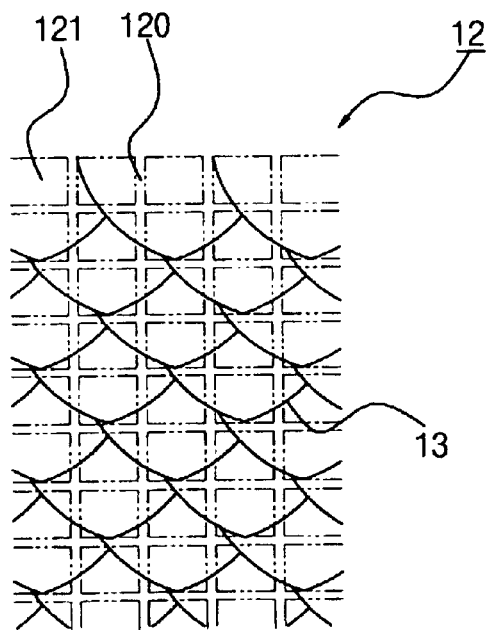
FIG. 3 is a front view illustrating a wind inlet opening and closing device of the windmill according to the present invention.
Figure 4:
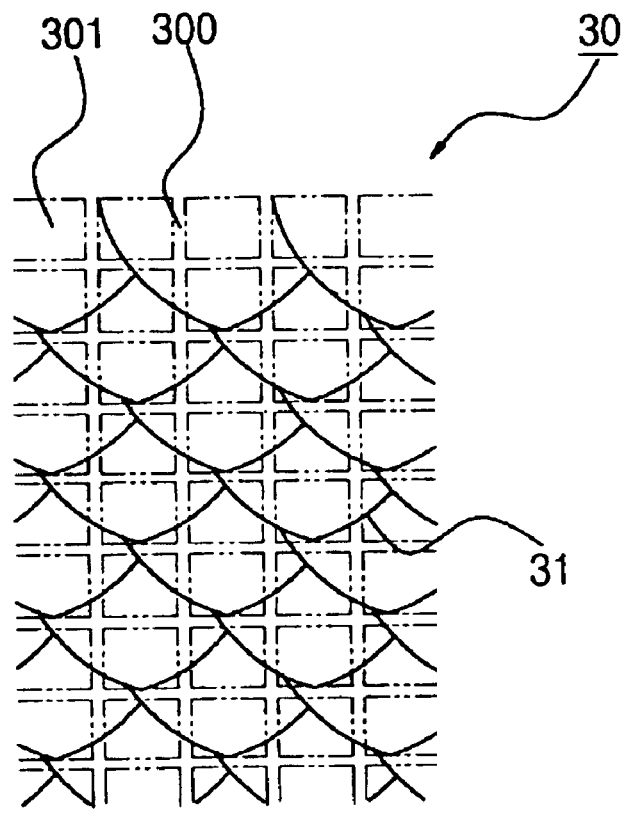
FIG. 4 is a front view illustrating a wind outlet opening and closing device of the windmill according to the present invention.
Figure 5:
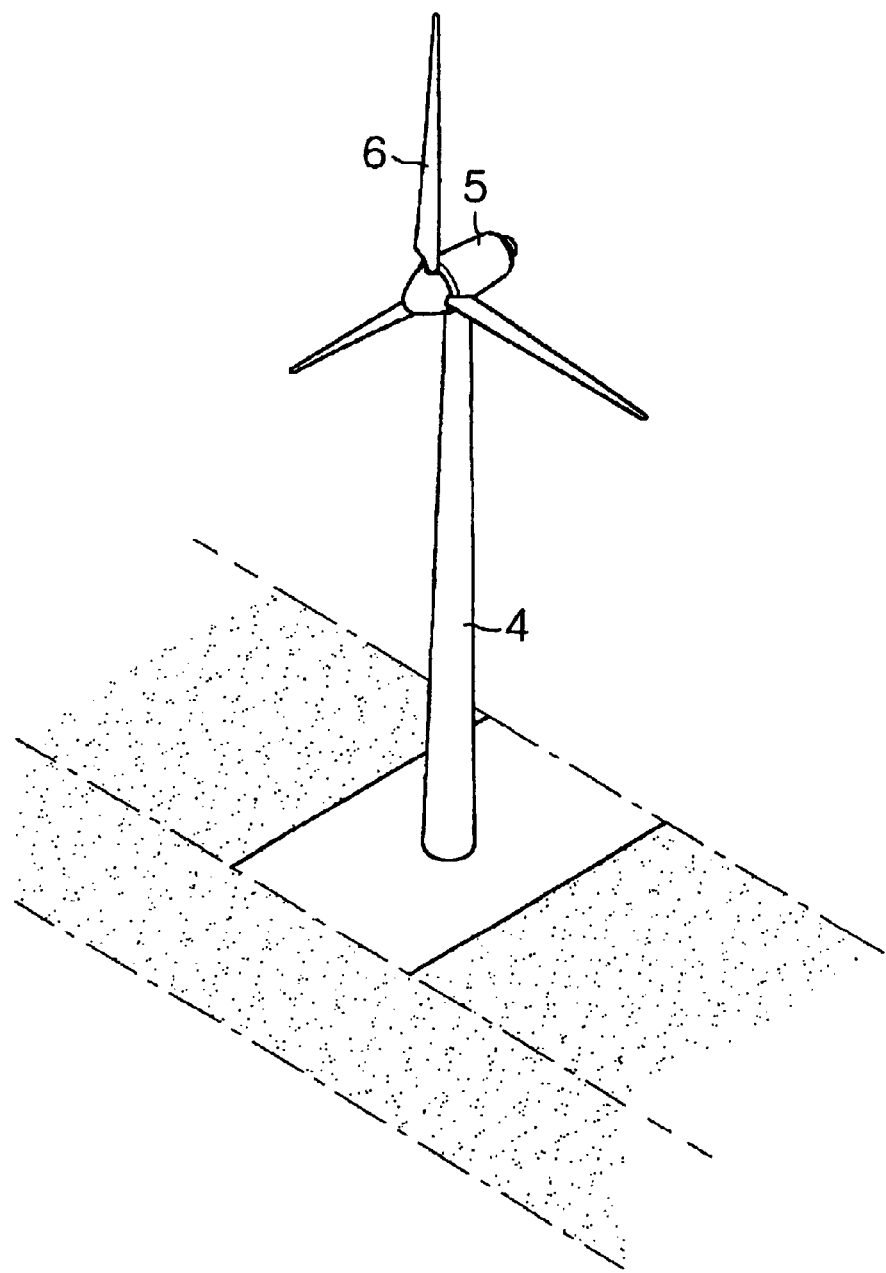
FIG. 5 is a perspective view illustrating a conventional windmill.

FIG. 1 is a partially enlarged cross-sectional view illustrating the entire construction of a windmill in accordance with an embodiment of the present invention; FIG. 2 is a front view of the windmill according to the present invention; FIG. 3 is a front view illustrating a wind inlet opening and closing device of the windmill according to the present invention; and FIG. 4 is a front view illustrating a wind outlet opening and closing device of the windmill according to the present invention.

A windmill in accordance with an embodiment of the present invention comprises wind intake means 1, power generating means 2 and wind exhaust means 3.

The wind intake means 1 has wind guide plates 10 which are radially located to guide wind in a predetermined direction, an upper plate 11 which is installed on upper ends of the wind guide plates 10 to prevent dispersion of the wind, a wind inlet 12 which is defined between inner ends of two adjoining wind guide plates 10, and a wind inlet opening and closing device 13 which is placed at the wind inlet 12 so that the wind inlet opening and closing device 13 is opened by the wind flowing through the wind inlet 12 into the windmill and closed by the wind flowing through the wind inlet 12 out of the windmill. The wind inlet opening and closing device 13 comprises a plurality of scale-shaped pieces which are pivotally installed in the wind inlet 12.

The power generating means 2 has a power generating tunnel 20 which is defined at a lower end of the wind intake means 1, a generator 22 which rotates rotors 21 using the wind introduced into the windmill through the wind intake means 1 to generate electricity, and a charger 23 to which electricity generated by the generator 22 is charged.

The wind exhaust means 3 has a wind outlet 30 which is defined below the wind inlet 12 so that the wind used for generating electricity can be discharged to the outside through the wind outlet 30, and a wind outlet opening and closing device 31 which is placed at the wind outlet 30 so that the wind outlet opening and closing device 31 is opened by the wind flowing through the wind outlet 30 out of the windmill and closed by the wind flowing through the wind outlet 30 into the windmill. The wind outlet opening and closing device 31 comprises a plurality of scale-shaped pieces which are pivotally installed in the wind outlet 31.

The respective wind inlet 12 and the wind outlet 30 comprise a plurality of cells 121 and 301 which are defined by plaiting a plurality of wires 120 and 300 in the form of a lattice.

Hereafter, operations of the windmill according to the present invention, constructed as mentioned above, will be described.

As shown in FIG. 1, the wind blowing in any direction is guided by the wind guide plates 10 to be collected and then introduced into the windmill through the wind inlet 12. Lower ends of the wind guide plates 10 are closed by the charger 23 having substantially a conical sectional shape, and the upper ends of the wind guide plates 10 are closed by the upper plate 11. The more the wind flows inward toward the wind inlet 12, the more a sectional area through which the wind passes is reduced. Due to this fact, the wind flows through the wind inlet 12 at an increased velocity.

As shown in the partially enlarged upper parts of FIG. 1 and in FIG. 3, the wind inlet 12 comprises the plurality of cells 121 which are defined by plaiting the plurality of wires 120 in the form of a lattice.

As can be readily seen from FIG. 3, due to the fact that the wind inlet opening and closing device 13 comprising the plurality of scale-shaped pieces is pivotally installed in the air inlet 12, one wind inlet opening and closing device 13 through which the wind is introduced into the windmill is opened by the wind flowing through the wind inlet 12, and another wind inlet opening and closing device 13 which is positioned behind the one wind inlet opening and closing device 13 and through which the wind is discharged out of the windmill is closed by the wind flowing through the wind inlet 12.

The wind, which is introduced into the windmill through the wind inlet opening and closing device 13 as described above, flows through the power generating tunnel 20 and rotates the rotors 21 which are arranged in the power generating tunnel 20. By this fact, the generator 22 generates electricity, and the electricity generated by the generator 22 is charged into the charger 23.

The wind rotating the rotors 21 flows downward through the generating tunnel 20 and then, is discharged through the wind outlet 30 which is defined below the wind inlet 12.

As shown in the partially enlarged lower parts of FIG. 1 and in FIG. 4, the wind outlet 30 comprises the plurality of cells 301 which are defined by plaiting the plurality of wires 300 in the form of a lattice.

Also, as can be readily seen from FIG. 4, due to the fact that the wind outlet opening and closing device 31 comprising the plurality of scale-shaped pieces is pivotally installed in the air outlet 30, one wind outlet opening and closing device 31 through which the wind is introduced into the windmill is closed by the wind flowing through the wind outlet 30, and another wind outlet opening and closing device 31 which is positioned behind the one wind outlet opening and closing device 31 and through which the wind is discharged out of the windmill is opened by the wind flowing through the wind outlet 30.

INDUSTRIAL APPLICABILITY

As apparent from the above description, the windmill according to the present invention provides advantages in that, since the windmill has wind guide plates extending in a radial direction and an upper plate for preventing dispersion of the wind, it is possible to collect the wind and thereby increase an air density. Due to this fact, electricity can be stably generated using wind force irrespective of a wind direction or a wind velocity. Therefore, the windmill according to the present invention can be installed in urban areas and mountain villages where a wind direction and a wind velocity frequently change. Further, because the windmill according to the present invention is constructed not to be easily broken even by strong wind, repair and maintenance expenses can be reduced, and economic efficiency is ensured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A windmill, comprising:
   wind intake means having wind guide plates which are radially located to guide wind in a predetermined direction, an upper plate which is installed on upper ends of the wind guide plates to prevent dispersion of the wind, a wind inlet which is defined between inner ends of two adjoining wind guide plates, and a wind inlet opening and closing device which is placed at the wind inlet so that the wind inlet opening and closing device is opened by the wind flowing through the wind inlet into the windmill and closed by the wind flowing through the wind inlet out of the windmill;
   power generating means disposed in a power generating tunnel which is defined at a lower end of the wind intake means, to rotate rotors by the wind introduced into the windmill through the wind intake means and thereby generate electricity; and
   wind exhaust means having a wind outlet which is defined below the wind inlet so that the wind used for generating electricity can be discharged to the outside through the wind outlet, and a wind outlet opening and closing device which is placed at the wind outlet so that the wind outlet opening and closing device is opened by the wind flowing through the wind outlet out of the windmill and closed by the wind flowing through the wind outlet into the windmill.

2. The windmill as set forth in claim 1, wherein each of the wind inlet and the wind outlet comprises a plurality of cells which are defined by plaiting a plurality of wires in the form of a lattice.

3. The windmill as set forth in claim 1, wherein each of the wind inlet opening and closing device and the wind outlet opening and closing device comprises a plurality of scale-shaped pieces which are pivotally installed in the cells, respectively.

* * * * *